United States Patent [19]
Kuwajima

[11] Patent Number: 5,523,748
[45] Date of Patent: Jun. 4, 1996

[54] METHOD AND APPARATUS FOR INTERRUPTING COMMUNICATION CONTROL UNITS IN AN EXCLUSIVE MODE

[75] Inventor: Takeshi Kuwajima, Tokyo, Japan

[73] Assignee: NEC Corporation, Tokyo, Japan

[21] Appl. No.: 127,347

[22] Filed: Sep. 28, 1993

[30] Foreign Application Priority Data

Oct. 2, 1992 [JP] Japan .................................. 4-264455
Oct. 2, 1992 [JP] Japan .................................. 4-264464

[51] Int. Cl.$^6$ .............................. G05B 23/02; H01J 3/24
[52] U.S. Cl. ................... 340/825.07; 340/825.08; 370/94.1
[58] Field of Search ................. 340/825.07, 825.08; 370/94.1, 85.2

[56] References Cited

U.S. PATENT DOCUMENTS 5,003,536  3/1991  Tanaka et al. ..................... 370/94.1
5,031,175  7/1991  Tanaka et al. ..................... 370/94.1
5,175,730  12/1992  Murai ............................... 340/825.07

FOREIGN PATENT DOCUMENTS 64-44151  2/1989  Japan .

Primary Examiner—Donald J. Yusko
Assistant Examiner—Edward Merz
Attorney, Agent, or Firm—Foley & Lardner

[57] ABSTRACT

A communication control method in which a communication control unit $A_2$ in an exclusive communication mode with a communication control unit $A_1$ receives a requesting frame of an exclusive communication mode or broadcast communication frames from another communication control unit B. Unit B sends a communication frame for announcing an exclusive communication mode after receiving a NAK response from unit $A_2$, sends message frames after the elapse of a predetermined time $T_1$, and then sends a frame releasing the exclusive communication mode between Unit B and Unit $A_2$ after sending the message frames. After receiving the announcing frame from unit B, unit $A_2$ communicates with unit $A_1$ to release the exclusive mode between them within the time $T_1$, enters an exclusive mode with unit B, and then receives communication frames from unit B until it receives the frame of releasing the exclusive mode with unit B. When simultaneous broadcasting frames from unit B are detected, communication control unit $A_1$, which is in the exclusive communication mode and transmitting message frames to unit $A_2$, transmits a communication frame for temporarily releasing the exclusive communication mode to unit $A_2$. The exclusive communication mode between units $A_1$ and $A_2$ is revived after unit $A_2$ receives the casting frames from unit B.

8 Claims, 7 Drawing Sheets

METHOD AND APPARATUS FOR INTERRUPTING COMMUNICATION CONTROL UNITS IN AN EXCLUSIVE MODE

BACKGROUND OF THE INVENTION

1. Field of the Invention

The present invention relates to a method of controlling communications in a communication system comprising at least three communication control units connected to a single transmission line, and more particularly to a method of controlling communications in such a communication system in which at least one set of communication control units is in an exclusive communication mode.

2. Description of the Related Art

Figure 2:
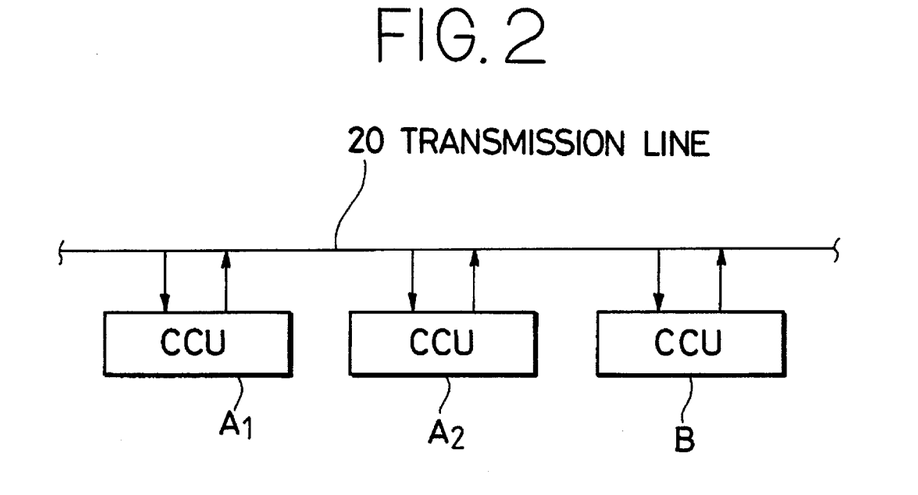
FIG. 2 is a block diagram of a communication system in which three communication control apparatus, each identical to the communication control apparatus shown in FIG. 1, are connected to a single transmission line.
Figure 3:
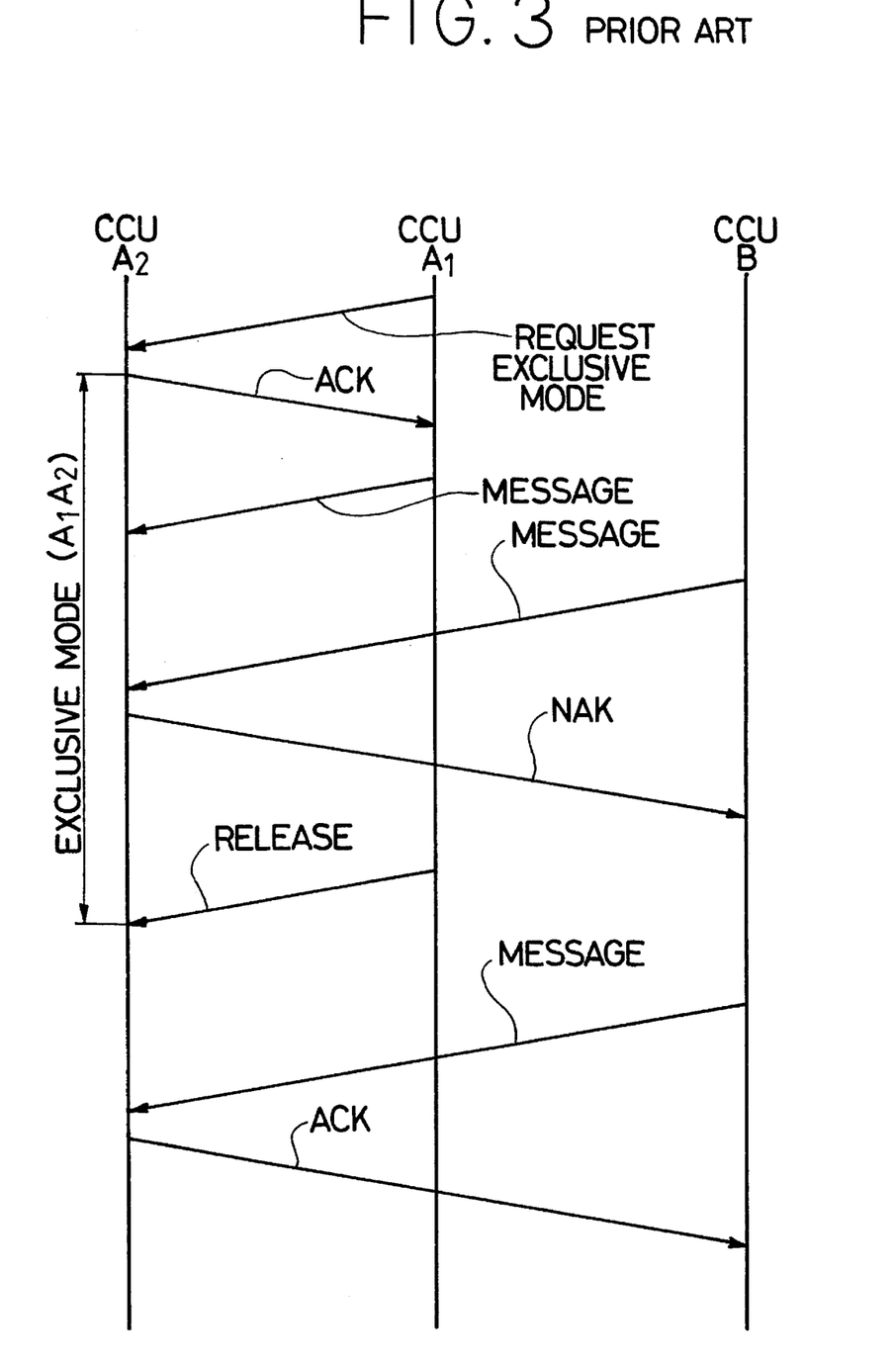
FIG. 3 is a diagram showing a sequence of operation of a first and second communication control apparatus $A_1$, $A_2$ which are in an exclusive communication mode and a third communication control apparatus B which attempts to access the second communication control apparatus $A_2$.

One conventional method of controlling communications will be described below with reference to FIGS. 1 through 3 of the accompanying drawings.

Figure 1:
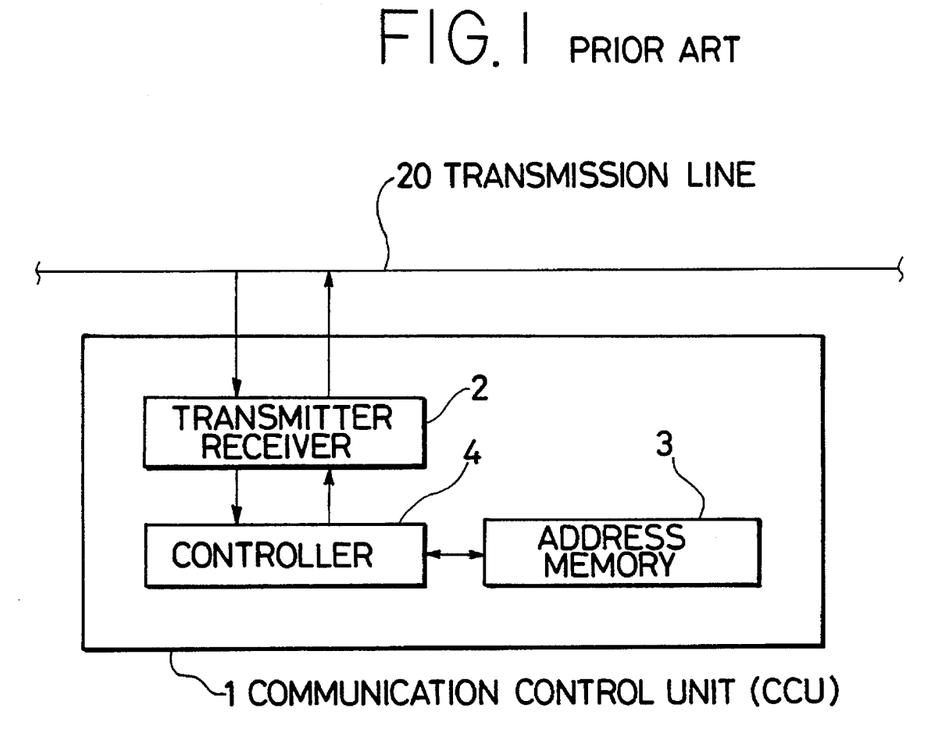
FIG. 1 is a block diagram of a conventional communication control apparatus.

FIG. 1 shows in block form a conventional communication control apparatus 1. FIG. 2 shows in block form a communication system comprising three communication control apparatus $A_1$, $A_2$, B, each identical to the conventional communication control apparatus 1, which are connected to a single transmission line 20. FIG. 3 shows a sequence of operation in which data is transmitted from communication control apparatus B to communication control apparatus $A_1$.

As shown in FIG. 1, communication control apparatus 1 comprises a transmitter/receiver 2 for transmitting a communication frame composed of message data and a transmission control signal by the transmission line 20 to another communication control apparatus according to a predetermined communication protocol and for receiving a message frame transmitted from the other communication control apparatus, an address memory 3 for storing address information of all communication control apparatus that are connected to the transmission line 20, and a controller 4 for controlling operation of the transmitter/receiver 2 and the address memory 3. In FIG. 2, three communication control apparatus $A_1$, $A_2$, B, each identical to communication control apparatus 1, are connected to the transmission line 20. However, more communication control apparatus may be connected to the transmission line 20.

Now, it is assumed that information is to be continuously transmitted from one of the communication control apparatus, for example, communication control apparatus $A_1$, to another communication control apparatus, for example, communication control apparatus $A_2$. To prevent another communication control apparatus from intervening in the communication between communication control apparatus $A_1$ and $A_2$, communication control apparatus $A_1$ first transmits a communication frame indicative of an exclusive communication mode request to communication control apparatus $A_2$, as shown in FIG. 3. If communication control apparatus $A_2$ has properly received the communication frame and it is possible to effect exclusive communications between the communication control apparatus $A_1$ and $A_2$, communication control apparatus $A_2$ sends an acknowledgment (ACK) signal to communication control apparatus $A_1$. After having received the ACK signal, communication control apparatus $A_1$ continuously transmits a communication frame to communication control apparatus $A_2$. When the transmission of the communication frame is finished, communication control apparatus $A_1$ transmits a communication frame for releasing the exclusive communication mode to communication control apparatus $A_2$. The exclusive communication mode between communication control apparatus $A_1$ and $A_2$ continues for the period of time after communication control apparatus $A_2$ sends the ACK signal until it receives the communication frame for releasing the exclusive communication mode. If during this period communication control apparatus B, which is not in an exclusive communication mode, transmits a communication frame to communication control apparatus $A_2$, communication control apparatus $A_2$ returns a negative acknowledgment (NAK) signal to communication control apparatus B as communication control apparatus $A_2$ cannot receive the communication frame from communication control apparatus B.

As described above, the exclusive communication mode continues until communication control apparatus $A_2$ receives the communication frame for releasing the exclusive communication mode which is transmitted from communication control apparatus $A_1$, which is the communication control apparatus that initiated the exclusive communication mode. Since communication control apparatus B is not supplied with the communication frame for releasing the exclusive communication mode, communication control apparatus B, which has received the NAK signal, must continuously call until exclusive communication mode is released and an ACK signal is returned.

Japanese patent laid-open publication No. 44151/1989 discloses a communication system which is designed to solve the above problem. According to the disclosed communication system, if communication control apparatus $A_1$, which has requested an exclusive communication mode, fails to transmit a communication frame for releasing the exclusive communication mode during a predetermined period of time after having transmitted a communication frame, communication control apparatus $A_2$, which has been requested to enter the exclusive communication mode, releases the exclusive communication mode itself, thus shortening the period of time occupied for the exclusive communication mode.

The disclosed communication system, however, still suffers a drawback in that while a communication control apparatus is in an exclusive communication mode for a long period of time or in a simultaneous broadcasting communication mode in which it transmits a communication frame without requesting an exclusive communication mode, another communication control apparatus which is not in the exclusive communication mode cannot access the communication control apparatus in the exclusive communication mode.

SUMMARY OF THE INVENTION

It is therefore an object of the present invention to provide a method of controlling communications which allows a third communication control apparatus to intervene between communication control apparatus that are in an exclusive communication mode.

According to the present invention, there is provided a method of controlling communications in a communication system including at least three of a first, second, and third communication control apparatus connected to each other by a single transmission line in which the first and second communication control apparatus $A_1$, $A_2$ are held in an exclusive communication mode as a requesting and a requested communication control apparatus, respectively, after the second communication control apparatus $A_2$ returns a communication frame as an acknowledgment signal in response to a communication frame transmitted from the first communication control apparatus $A_1$ to the second communication control apparatus $A_2$ for requesting the exclusive communication mode, and this exclusive communication mode is maintained until the second communication control apparatus $A_2$ receives a communication frame transmitted from the first communication control apparatus $A_1$ for releasing the exclusive communication mode, the method comprising the steps of: in response to a communication frame for requesting an exclusive communication mode transmitted from the third communication control apparatus B to either one of the first and second communication control apparatus, which is called hereinafter a communication control apparatus Ax, returning a negative acknowledgment signal to the third communication control apparatus B from the communication control apparatus Ax that has received the communication frame for requesting; after having received the negative acknowledgment signal, transmitting from the third communication control apparatus B to the communication control apparatus Ax a communication frame for announcing an exclusive communication mode and, after the elapse of a predetermined time, transmitting from the third communication control apparatus B to the communication control apparatus Ax a communication frame of a communication message; releasing the exclusive communication mode between the first and second communication control apparatus $A_1$, $A_2$ within the predetermined time after the communication control apparatus Ax has received the communication frame for announcing an exclusive communication mode, and thereafter, receiving the communication frame of the communication message transmitted from the third communication control apparatus B; and holding the third communication control apparatus B and the communication control apparatus Ax as transmitting and receiving communication control apparatus, respectively, in an exclusive communication mode after the exclusive communication mode between the first and second communication control apparatus is released until a communication frame for releasing the exclusive communication mode transmitted from the third communication control apparatus B is received.

If the volume of communication traffic of the transmission line is smaller than a predetermined value, the third communication control apparatus B starts to communicate with the receiving communication control apparatus Ax in the exclusive communication mode after having received an acknowledgment signal in response to the communication frame for requesting an exclusive communication mode, and if the volume of communication traffic of the transmission line is larger than the predetermined value, the third communication control apparatus B starts to communicate with the receiving communication control apparatus Ax in the exclusive communication mode upon elapse of the predetermined time after having transmitted the communication frame for announcing an exclusive communication mode, and wherein the exclusive communication mode between the transmitting and receiving communication control apparatus B, Ax is ended when the communication frame for releasing the exclusive communication mode is received by the receiving communication control apparatus Ax.

The method may alternatively comprise the steps of: in response to a communication frame in a simultaneous broadcasting communication mode transmitted from the third communication control apparatus B, transmitting from the first communication control apparatus $A_1$ to the second communication control apparatus $A_2$ a communication frame for temporarily releasing the exclusive communication mode; receiving at the second communication control apparatus $A_2$ the communication frame in the simultaneous broadcasting communication mode after the second communication control apparatus $A_2$ has received the communication frame for temporarily releasing the exclusive communication mode; starting to transmit a communication frame of a communication message from the first communication control apparatus $A_1$ to the second communication control apparatus $A_2$ after the first communication control apparatus $A_1$ has detected the ending of the communication frame in the simultaneous broadcasting communication mode; and receiving at the second communication control apparatus $A_2$ the communication frame of the communication message transmitted from the first communication control apparatus $A_1$ in the exclusive communication mode.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 4:
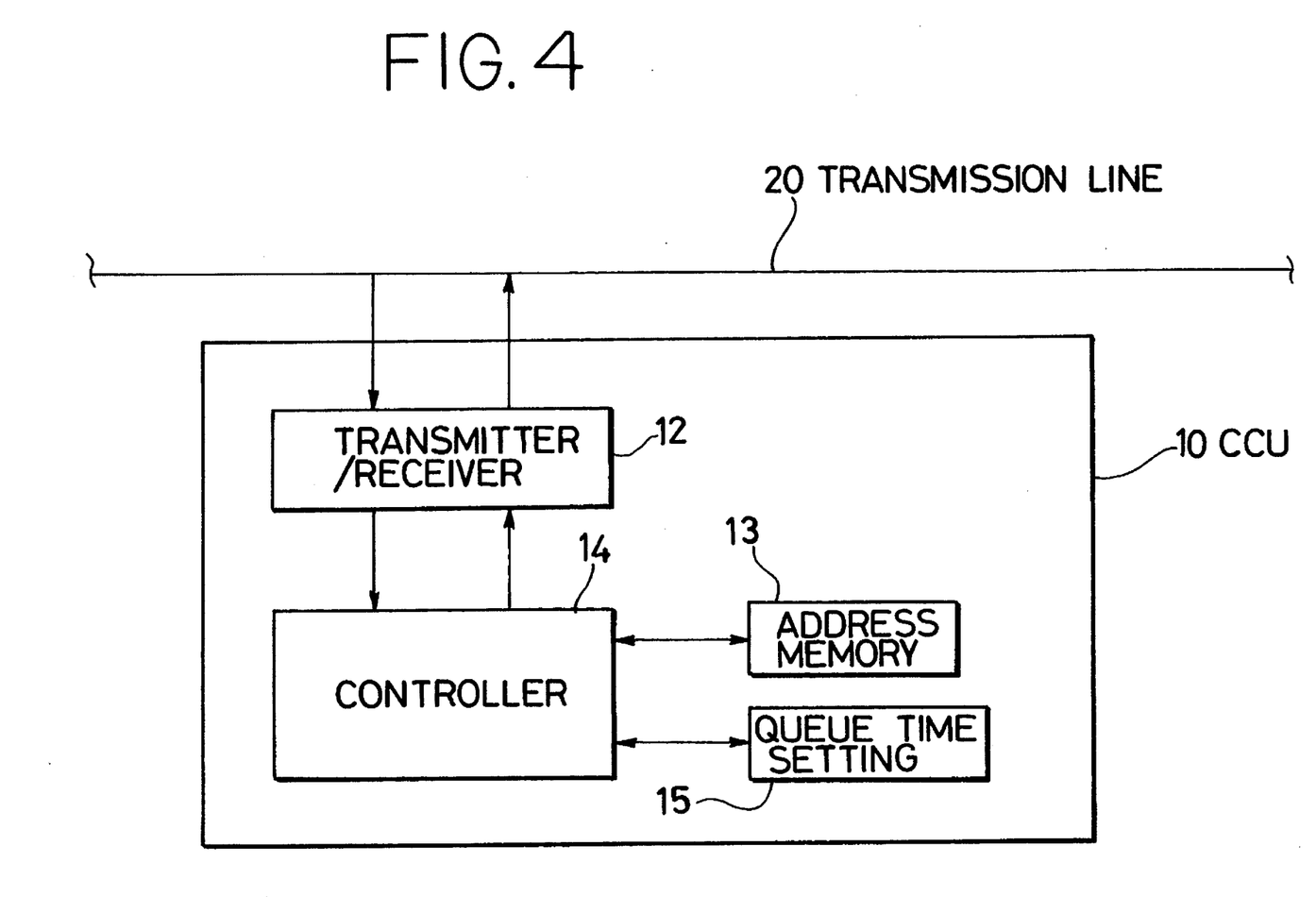
FIG. 4 is a block diagram of a communication control apparatus controlled by a communication control method according to a first embodiment of the present invention.

As shown in FIG. 4, a communication control apparatus 10 controlled by a communication control method according to a first embodiment of the present invention has a transmitter/receiver 12, an address memory 13, and a controller 14, which are essentially the same as those of the conventional communication control apparatus shown in FIG. 1. The communication control apparatus 10 additionally includes a queue time setting unit 15 for setting a predetermined time. The predetermined time is a queue time to be spent after a third communication control apparatus has transmitted a communication frame for announcing an exclusive communication mode until it starts transmitting a communication frame including a communication message. The queue time is determined depending on the period of time that is required for the first and second communication control apparatus in an exclusive communication mode to release the exclusive communication mode and for the second and third communication control apparatus to switch into an exclusive communication mode.

Figure 5:
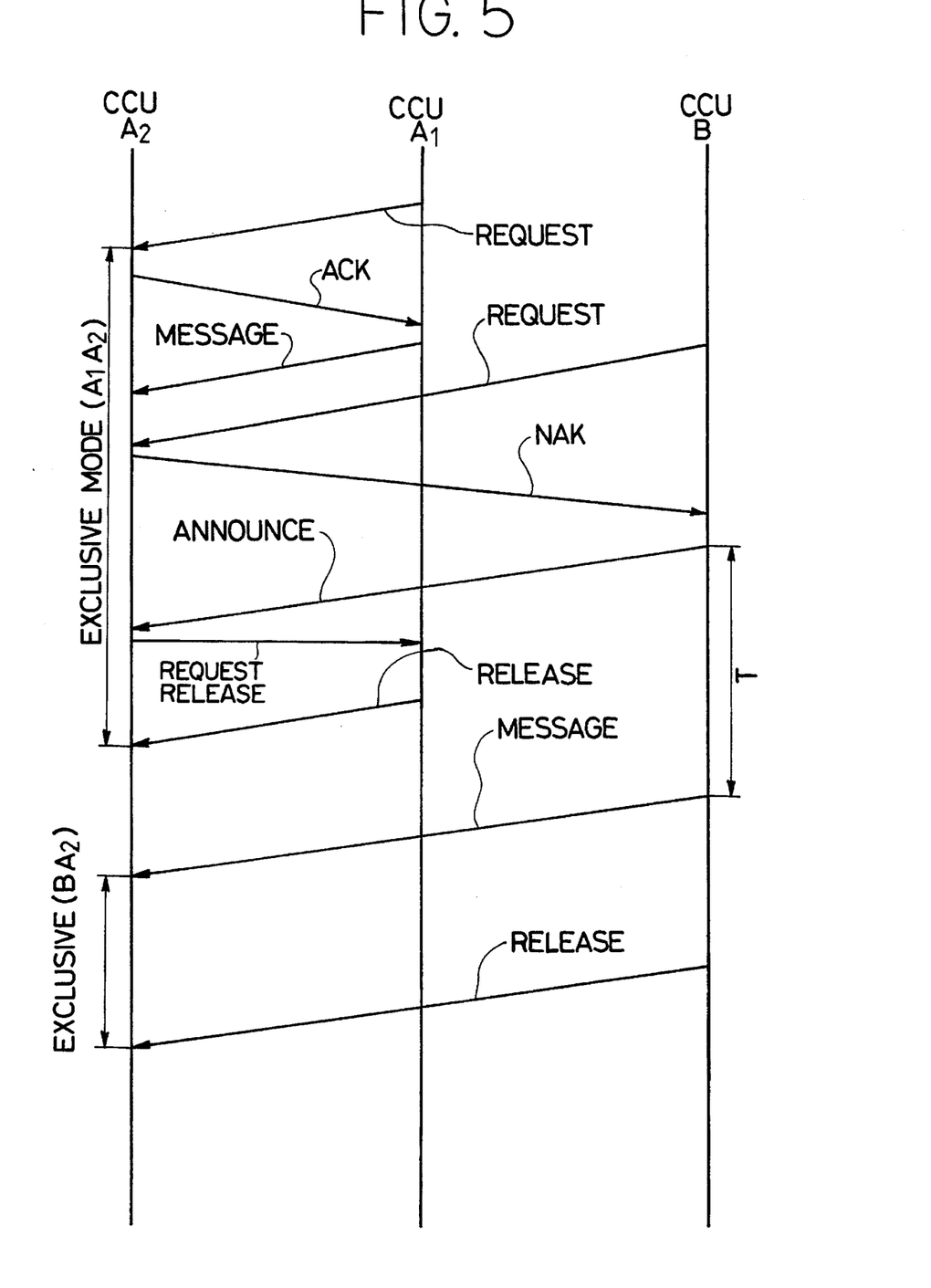
FIG. 5 is a sequence of operation of a communication system composed of three communication control apparatus, each identical to the communication control apparatus shown in FIG. 4.

As shown in FIG. 5, a communication system comprises three communication control apparatus $A_1$, $A_2$, B, each identical to a communication control apparatus 10, connected to a transmission line 20. It is assumed that communication control apparatus $A_1$ transmits a communication frame to communication control apparatus $A_2$ in an exclusive communication mode. First, communication control apparatus $A_1$ transmits a communication frame for requesting an exclusive communication mode to communication control apparatus $A_2$. In response to the communication frame for requesting an exclusive communication mode, communication control apparatus $A_2$ returns a communication frame of an ACK signal to communication control apparatus $A_1$ if communication control apparatus $A_2$ is not in an exclusive communication mode with another communication control apparatus and can operate in an exclusive communication mode with communication control apparatus $A_1$. Now, the exclusive communication mode is established between communication control apparatus $A_1$ and $A_2$. If communication control apparatus $A_2$ is in an exclusive communication mode with another communication control apparatus and cannot operate in an exclusive communication mode with communication control apparatus $A_1$, communication control apparatus $A_2$ returns a communication frame of a NAK signal to communication control apparatus $A_1$. In the event that communication control apparatus $A_2$ does not respond due to a failure, communication control apparatus $A_1$ regards communication control apparatus $A_2$ as having returned a NAK signal. The above process is the same as the conventional process.

According to the first embodiment, when communication control apparatus $A_1$ and $A_2$ are in the exclusive communication mode, if communication control apparatus B transmits a communication frame for requesting an exclusive communication mode to communication control apparatus $A_2$ and receives, as a matter of course, a communication frame of a NAK signal from communication control apparatus $A_2$, communication control apparatus B transmits a communication frame for announcing an exclusive communication mode to communication control apparatus $A_2$. In response to the received communication frame for announcing an exclusive communication mode, communication control apparatus $A_2$ communicates with communication control apparatus $A_1$ such that communication control apparatus $A_1$ releases the exclusive communication mode with communication control apparatus $A_2$ within a predetermined time T. The exclusive communication mode between communication control apparatus $A_1$ and $A_2$ is now released, and an exclusive communication mode is newly established between communication control apparatus B and $A_2$. After the elapse of the predetermined time T, which is equal to the queue time, after communication control apparatus B has transmitted the communication frame for announcing an exclusive communication mode, communication control apparatus B transmits a communication frame including a communication message to communication control apparatus $A_2$. The exclusive communication mode between the communication control apparatus B and $A_2$ is finished when communication control apparatus B transmits a communication frame for releasing the exclusive communication mode and communication control apparatus $A_2$ receives the transmitted communication frame.

Figure 6:
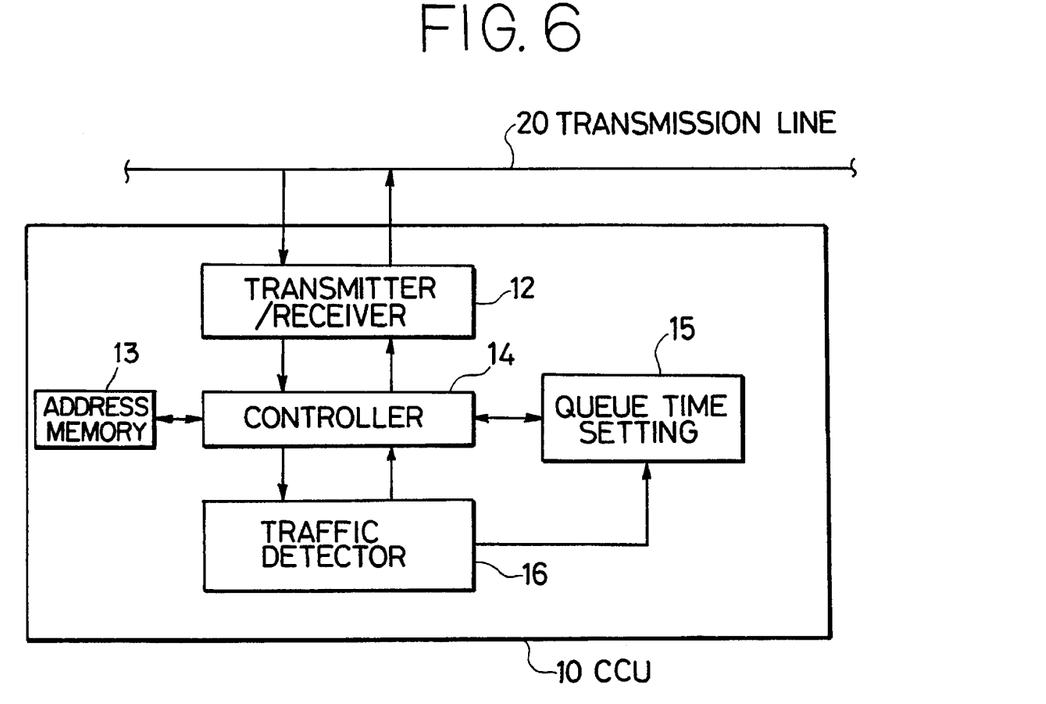
FIG. 6 is a block diagram of a communication control apparatus controlled by a communication control method according to a second embodiment of the present invention.
Figure 7:
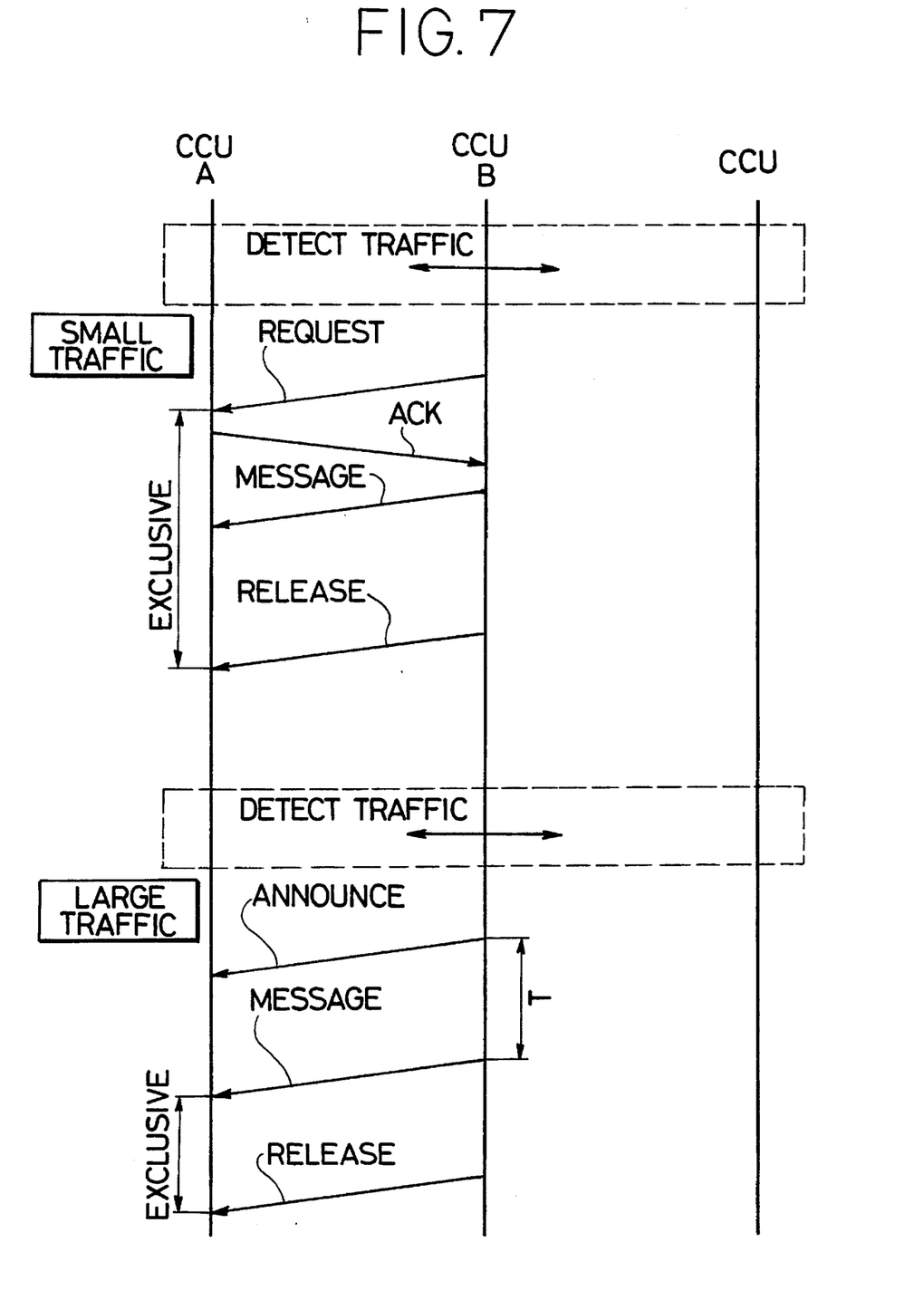
FIG. 7 is a sequence of operation of a communication system composed of three communication control apparatus, each identical to the communication control apparatus shown in FIG. 6.

FIG. 6 shows a communication control apparatus 10 controlled by a communication control method according to a second embodiment of the present invention. Communication control apparatus 10 shown in FIG. 6 has a transmitter/receiver 12, an address memory 13, a controller 14, a queue time setting unit 15, and a communication traffic volume detector 16 connected to the controller 14 for detecting the total communication traffic volume of the transmission line 20. According to the first embodiment, when communication control apparatus B starts to communicate with communication control apparatus $A_2$ in an exclusive communication mode, communication control apparatus B first sends a communication frame for requesting an exclusive communication mode to communication control apparatus $A_2$. In response to an ACK signal, communication control apparatus B establishes an exclusive communication mode with communication control apparatus $A_2$ and then transmits a communication message. In response to a NAK signal, communication control apparatus B transmits a communication frame for announcing an exclusive communication mode, and, after elapse of the time T, transmits a communication message. According to the second embodiment, however, communication control apparatus B selects a communication frame to be transmitted to communication control apparatus $A_2$ depending on the volume of a communication traffic which is detected by the communication traffic volume detector 16. More specifically, as shown in FIG. 7, if the detected length of a communication message is smaller than a predetermined volume, communication control apparatus B transmits a communication frame for requesting an exclusive communication mode to communication control apparatus $A_2$, and if the volume of the traffic is larger than the predetermined value, communication control apparatus B transmits a communication frame for announcing an exclusive communication mode, including information of the queue time T, to communication control apparatus $A_2$, and starts transmitting a communication frame including the communication message to communication control apparatus $A_2$ after the elapse of the queue time T which has been set by the queue time setting unit 15.

Furthermore, as shown in FIG. 6, the output signal from the communication traffic volume detector 16 is supplied as a control signal to the queue time setting unit 15 to vary the queue time T depending on the value of the detected traffic value, so that the appropriate queue time is set according to the occasional condition of the transmission line.

Figure 8:
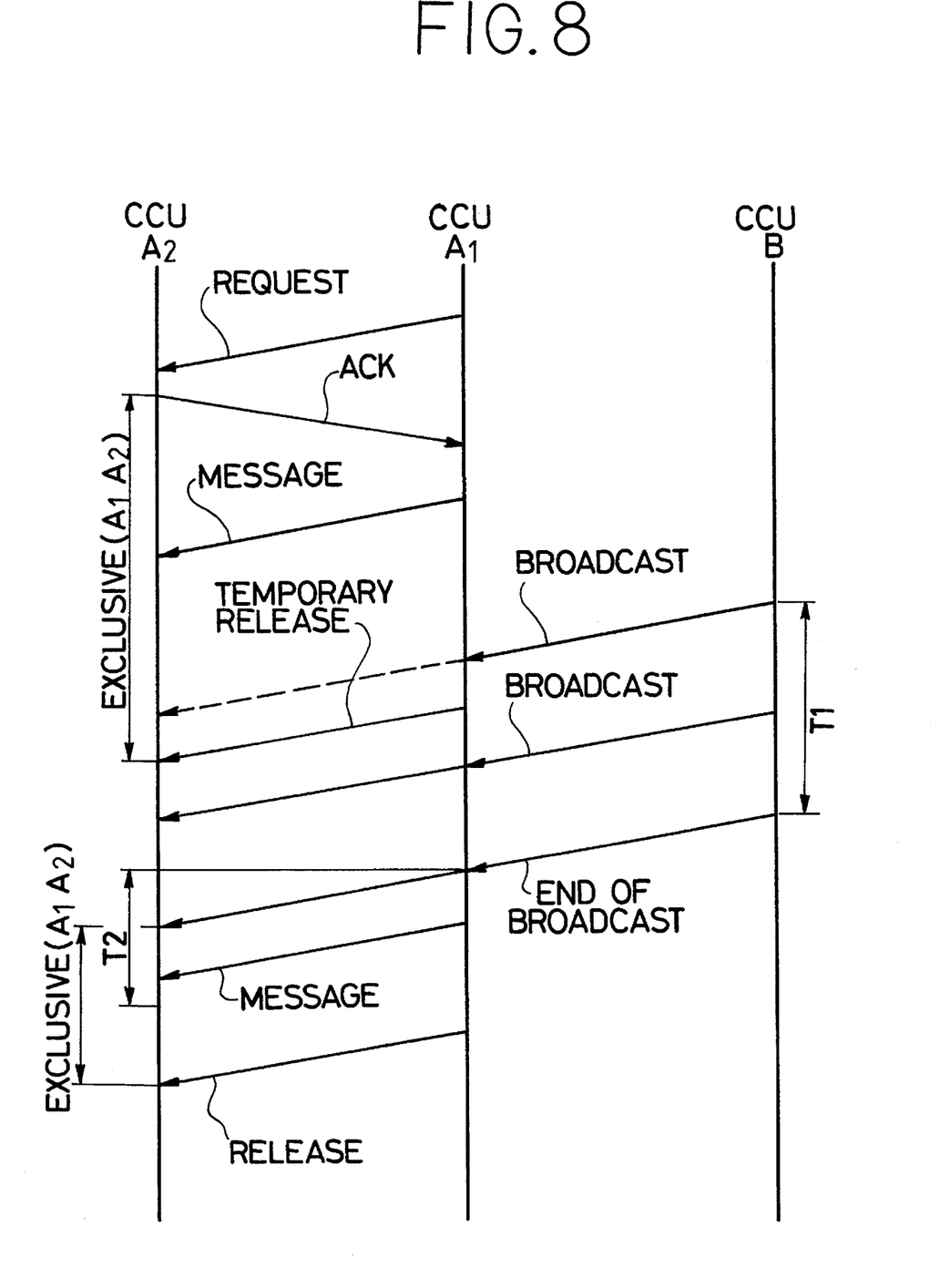
FIG. 8 is a sequence of operation of a simultaneous broadcasting mode.

A communication control method according to a third embodiment of the present invention, as shown in FIG. 8, is effective when communication frames are transmitted in a simultaneous broadcasting mode from one of the communication control apparatus, e.g., communication control apparatus B, to all other communication control apparatus. In FIG. 8, communication control apparatus B repeatedly transmits a simultaneous broadcasting communication frame during a predetermined time $T_1$, and finally transmits a communication frame for indicating the ending of the simultaneous broadcasting communication frame.

When the simultaneous broadcasting communication frame is transmitted from communication control apparatus B, communication control apparatus $A_1$, which is in an exclusive communication mode with communication control apparatus $A_2$ and from which communication frames are transmitted, responds to the transmitted simultaneous broadcasting communication frame to transmit a communication frame for temporarily releasing the exclusive communication mode to communication control apparatus $A_2$. Upon elapse of a predetermined time T2 after having received the communication frame indicating the ending of the simultaneous broadcasting communication frame, communication control apparatus $A_1$ resumes the exclusive communication mode with communication control apparatus $A_2$, and transmits a communication frame to communication control apparatus $A_2$. When the transmission of the communication frame is over, communication control apparatus $A_1$ transmits a communication frame for releasing the exclusive communication mode to communication control apparatus $A_2$, thereby releasing the exclusive communication mode.

When the exclusive communication mode is temporarily released by the communication frame for temporarily releasing the exclusive communication mode, communication control apparatus $A_2$ receives the simultaneous broadcasting communication frame from communication control apparatus B. After having received the communication frame for indicating the ending of the simultaneous broadcasting communication frame, communication control apparatus $A_2$ receives the communication frame from communication control apparatus $A_1$ until it receives the communication frame for releasing the exclusive communication mode.

Figure 9:
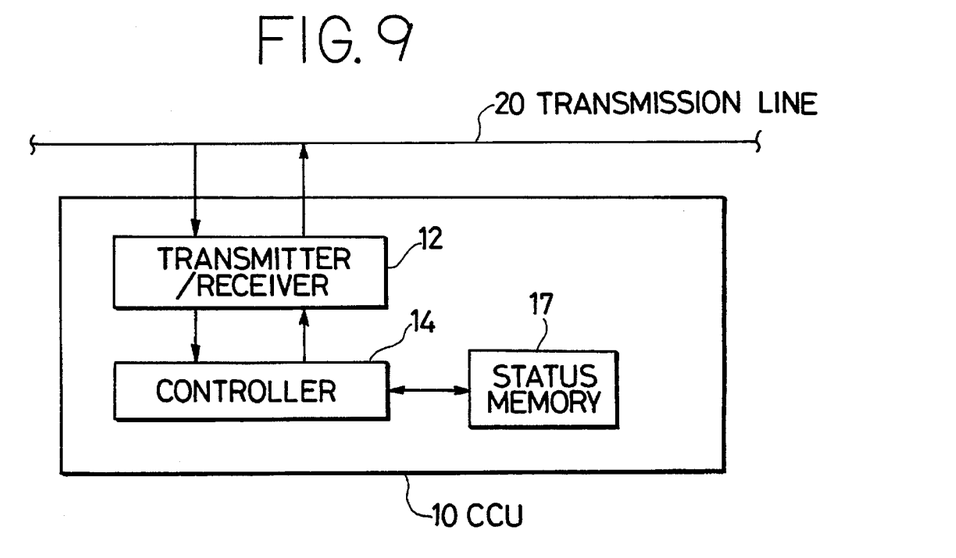
FIG. 9 is a block diagram of the communication control apparatus controlled by the communication control method according to the third embodiment of the present invention.

As shown in FIG. 9, communication control apparatus 10, which serves as each of the communication control apparatus $A_1$, $A_2$, and B shown in FIG. 8, has a transmitter/receiver 12 and a controller 14 which are the same as those shown in FIG. 4. The communication control apparatus 10 additionally includes a status memory 17 for storing a controlled status immediately before an exclusive communication mode is temporarily released. The controlled status is stored in the status memory 17 of each of the transmitting and receiving communication control apparatus which are in the exclusive communication mode. After the simultaneous broadcasting communication frame has been transmitted, the stored data is read from the status memory 17 to quickly restore the exclusive communication mode which has been temporarily released.

It is to be understood that variations and modifications of the method of controlling communications disclosed herein will be evident to those skilled in the art. It is intended that all such modifications and variations be included within the scope of the appended claims.

What is claimed is:

1. A method of controlling communications in a communication system including at least a first, second, and third communication control apparatus $A_1$, $A_2$ and B connected to each other by a single transmission line, for maintaining the first and second communication control apparatus $A_1$, $A_2$ as a requesting and a requested communication control apparatus, respectively, in an exclusive communication mode after the second communication control apparatus $A_2$ returns a communication frame of an acknowledgment signal in response to a communication frame for requesting the exclusive communication mode transmitted from the first communication control apparatus $A_1$ to the second communication control apparatus $A_2$, until a communication frame for releasing the exclusive communication mode that is transmitted from the first communication control apparatus $A_1$ is received by the second communication control apparatus $A_2$, said method comprising the steps of:

in response to a communication frame for requesting an exclusive communication mode transmitted from the third communication control apparatus B to one of the first and second communication control apparatus, hereinafter called a communication control apparatus Ax, returning from said communication control apparatus Ax a negative acknowledgment signal to said third communication control apparatus B;

transmitting a communication frame for announcing an exclusive communication mode to said communication control apparatus Ax from said third communication control apparatus B after having received said negative acknowledgment signal, and, after elapse of a predetermined time, transmitting a communication frame of a communication message from said third communication control apparatus B to said communication control apparatus Ax;

releasing the exclusive communication mode between said first and second communication control apparatus $A_1$, $A_2$ within said predetermined time after said communication control apparatus Ax has received the communication frame for announcing an exclusive communication mode, and thereafter receiving the communication frame of the communication message transmitted from said third communication control apparatus B; and holding said third communication control apparatus B and said communication control apparatus Ax as a transmitting and a receiving communication control apparatus, respectively, in an exclusive communication mode after the exclusive communication mode between said first and second communication control apparatus $A_1$, $A_2$ is released until a communication frame for releasing the exclusive communication mode transmitted from said third communication control apparatus B is received.

2. A method according to claim 1, wherein if communication traffic volume is smaller than a predetermined value, said third communication control apparatus B starts to communicate with said receiving communication control apparatus Ax in the exclusive communication mode after having received an acknowledgment signal in response to the communication frame for requesting an exclusive communication mode, and if the volume of the communication traffic on the transmission line is larger than the predetermined value, said third communication control apparatus B starts to communicate with said receiving communication control apparatus Ax in the exclusive communication mode upon elapse of said predetermined time after having transmitted the communication frame for announcing an exclusive communication mode, and wherein the exclusive communication mode between the transmitting and receiving communication control apparatus is ended when the communication frame for releasing the exclusive communication mode is received by said receiving communication control apparatus.

3. A method according to claim 2, wherein said third communication control apparatus B sets said predetermined time depending on a volume of the communication traffic on the transmission line, and said communication frame for announcing the exclusive communication mode contains information with respect to said predetermined time.

4. An apparatus for controlling communications in a communication system including at least a first $A_1$, second $A_2$, and third B communication control apparatus connected to each other by a single transmission line, for maintaining the first $A_1$ and second $A_2$ communication control apparatus as a requesting and a requested communication control apparatus, respectively, in an exclusive communication mode after the second communication control apparatus $A_2$ returns a communication frame of an acknowledgment signal in response to a communication frame for requesting the exclusive communication mode transmitted from the first communication control apparatus $A_1$ to the second communication control apparatus $A_2$, until a communication frame for releasing the exclusive communication mode transmitted from the first communication control apparatus $A_1$ is received by the second communication control apparatus $A_2$, comprising:

means for returning a negative acknowledgement signal to the third communication control apparatus B, from either the first or the second communication control apparatus $A_1$, $A_2$, which is called hereinafter a communication control apparatus Ax, the first and second communication control apparatus $A_1$, $A_2$ being in the exclusive communication mode and the communication control apparatus Ax being requested to be in a new exclusive communication mode by the third communication control apparatus B;

means for transmitting a communication frame for announcing an exclusive communication mode to said communication control apparatus Ax from said third communication control apparatus B after having received said negative acknowledgement signal;

queue time setting means for setting a queue time for the exclusive communication mode between said communication control apparatus Ax and said communication control apparatus B;

means for releasing the exclusive communication mode between the communication control apparatus $A_1$ and $A_2$ by the communication control apparatus Ax, within the queue time set by the queue time setting means;

means for setting the exclusive communication mode, between said communication control apparatus B, as a requesting and sending party, and said communication control apparatus Ax, as a requested and receiving party, when the queue time has elapsed after transmitting a communication frame for announcing said exclusive communication mode between said communication control apparatus Ax and said communication control apparatus B; and     means for releasing the exclusive communication mode between said communication control apparatus B and said communication control apparatus Ax by sending a releasing communication frame from said communication control apparatus B.

5. An apparatus according to claim 4, wherein each of said communication control apparatus has a communication traffic detecting means for detecting a volume of a communication traffic of the transmission line, queue time determining means for determining a queue time according to the volume of the communication traffic volume detected, and indicating means for indicating the queue time to another communication control apparatus.

6. An apparatus according to claim 4, wherein said means for releasing the exclusive communication mode between the communication control apparatus $A_1$ and $A_2$ by the communication control apparatus Ax is accomplished by the communication control apparatus Ax sending a exclusive mode release request signal to the communication control apparatus $A_1$ and $A_2$, and the communication control apparatus $A_1$ and $A_2$ sending an exclusive mode release signal to the communication control apparatus Ax in response to the exclusive mode release request signal within the queue time.

7. A method for controlling communications in a communication system including at least a first, second, and third communication control apparatus connected to each other by a single transmission line, for maintaining the first and second communication control apparatus as a requesting and a requested communication control apparatus, respectively, in an exclusive communication mode after the second communication control apparatus returns a communication frame of an acknowledgment signal in response to a communication frame for requesting the exclusive communication mode transmitted from the first communication control apparatus to the second communication control apparatus, until a communication frame for releasing the exclusive communication mode transmitted from the first communication control apparatus is received by the second communication control apparatus, the method comprising the steps of:

a) returning a negative acknowledgement signal to the third communication control apparatus, from a requested one of the first and the second communication control apparatus, the first and second communication control apparatus being in the exclusive communication mode, and the requested communication control apparatus to be in a new exclusive communication mode by the third communication control apparatus;

b) transmitting a communication frame for announcing an exclusive communication mode to said requested communication control apparatus from said third communication control apparatus after having received said negative acknowledgement signal;

c) setting a queue time for the exclusive communication mode between said requested communication control apparatus and said third communication control apparatus;

d) releasing the exclusive communication mode between the first and second communication control apparatus by the requested communication control apparatus, within the queue time;

e) setting the exclusive communication mode between said third communication control apparatus, as a requesting and sending party, and said requested communication control apparatus, as a requested and receiving party, when the queue time has elapsed after transmitting a communication frame for announcing said exclusive communication mode between said requested communication control apparatus and said third communication control apparatus; and     f) releasing the exclusive communication mode between said third communication control apparatus and said requested communication control apparatus by sending a releasing communication frame from said third communication control apparatus.

8. The method according to claim 7, wherein the step d) for releasing the exclusive communication mode between the first and second communication control apparatus by the requested communication control apparatus is accomplished by the requested communication control apparatus sending an exclusive mode release request signal to the other one of said first and second communication control apparatus, and the other one of said first and second communication control apparatus sending an exclusive mode release signal to the requested communication control apparatus in response to the exclusive mode release request signal within the queue time.

* * * * *